April 23, 1957     R. I. LAPPIN ET AL     2,789,604
SHREDDER UNIT
Filed May 5, 1955                           2 Sheets-Sheet 2
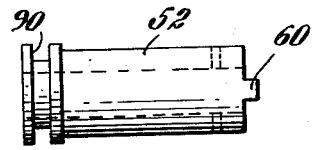
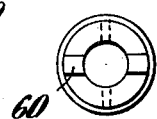
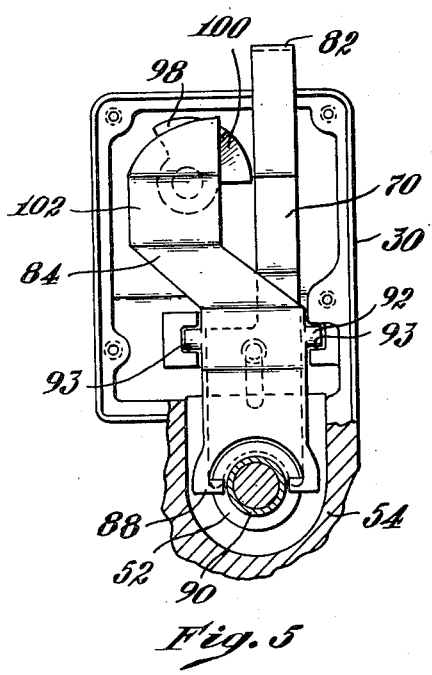
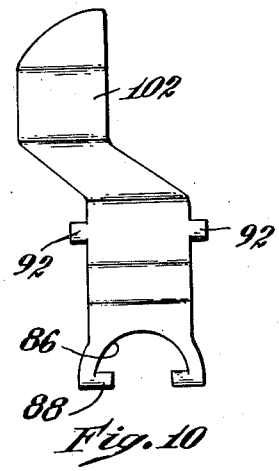
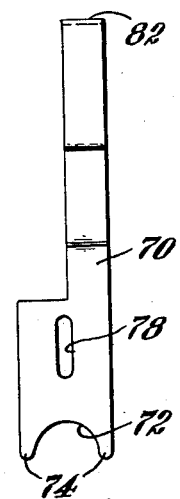
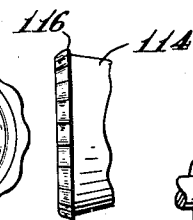
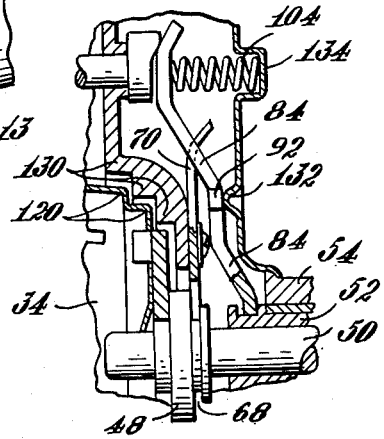
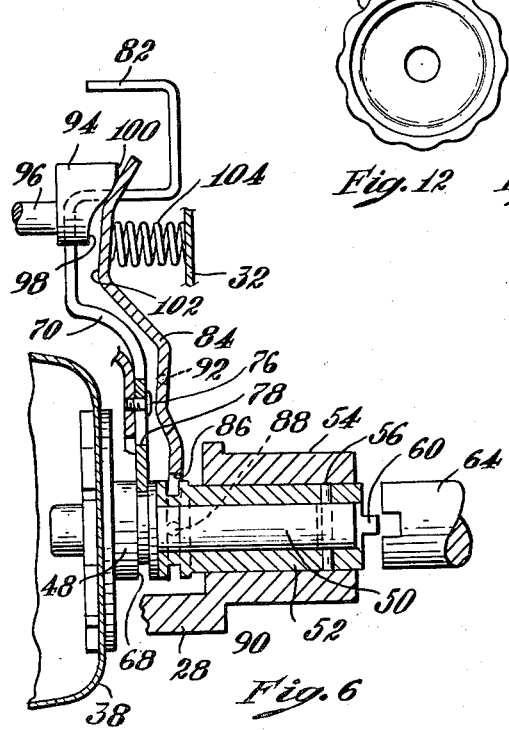
Inventors
Robert I. Lappin
Louis Zaiger
by Roberts, Cushman & Grover
Attys

United States Patent Office 2,789,604
Patented Apr. 23, 1957

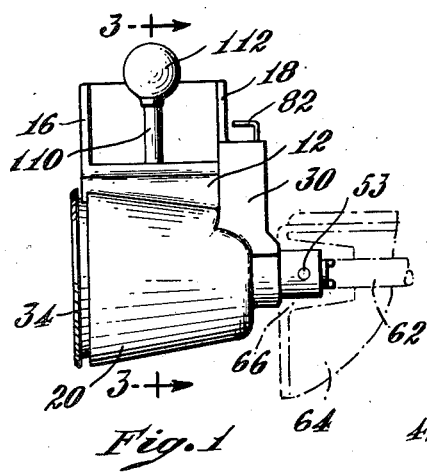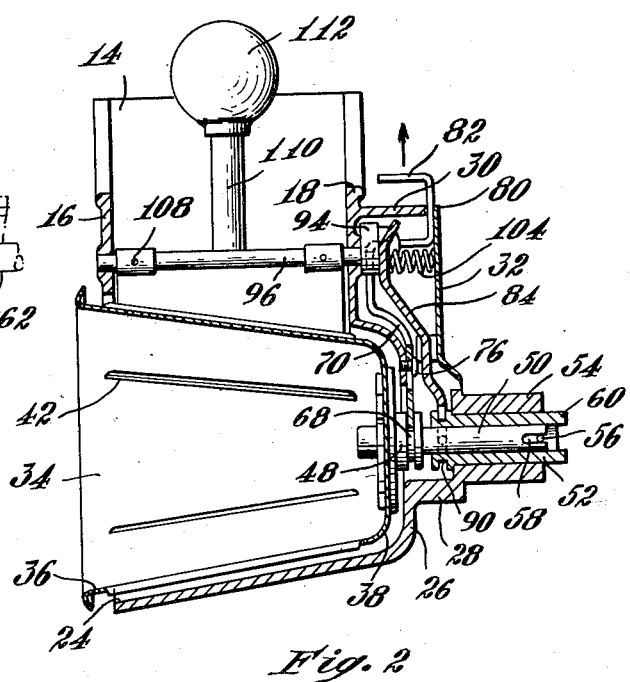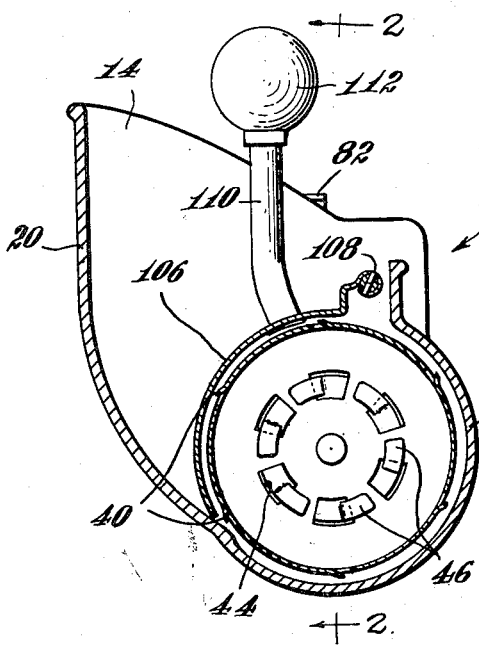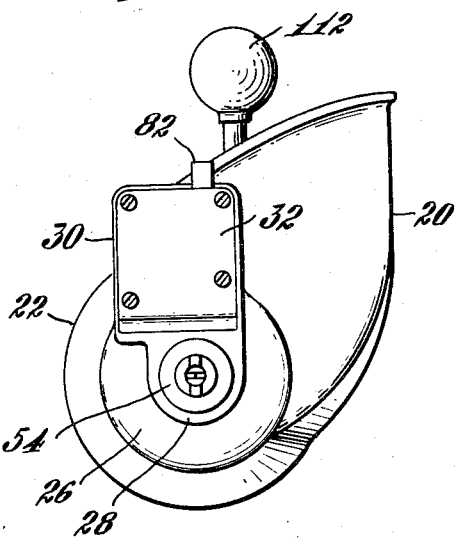

2,789,604

SHREDDER UNIT

Robert I. Lappin, Marblehead, and Louis Zaiger,
Swampscott, Mass.

Application May 5, 1955, Serial No. 506,165

10 Claims. (Cl. 146—92)

This invention relates to a kitchen appliance and more especially to a shredder assembly to be used in conjunction with a kitchen power unit containing a driving element to which the shredder may be coupled and a motor for driving the element.

The shredder herein disclosed is of the cone-type located for rotation near the bottom of a housing, the housing having an upwardly open mouth through which material to be operated upon may be fed to the cone and a discharge opening at one end in the lower part of the housing through which the shredded material may be discharged.

An object of this invention is to provide a shredder of the foregoing kind which may quickly and easily be mounted on our kitchen power unit for receiving power from a rotating drive shaft to effect rotation of the cutter cone. Another object is to provide means for engaging the cone shaft with the power shaft of the power unit or disengaging it therefrom independently of the means supporting the shredder on the power unit. Another object is to provide means for automatically disengaging the drive for the cone while material to be shredded is being placed in the shredder to avoid possible danger to the user's fingers. Another object is to provide means for reengaging the cone shaft with the power shaft when the shredder is loaded. Another object is to provide means for releasing the cone and/or cone shaft therefrom so that both the cone and the cone shaft may be removed for cleaning and cleaning of the housing. Another object is to provide means to facilitate grasping the mouth of the cone when removing it. Another object is to provide means which will retard entrance of the shredded material between the rear end of the cone and its housing. Still other objects are to provide a durable apparatus which is easy to keep clean, the parts of which may easily be manufactured, assembled and replaced when necessary and an apparatus which is compact and of pleasing appearance.

As herein illustrated the shredder assembly comprises a housing having an upwardly, open funnel-shaped mouth or hopper for receiving material to be shredded, a generally conical lower wall subjacent thereto for receiving a cone-shaped cutter for operating upon the material to be shredded, a discharge opening at one end of the lower part of the wall through which the shredded material may be discharged and a bearing at its opposite end for rotatably supporting a shaft to which a cone located within the housing is fastened for rotation. The shaft includes a spindle to which the cone may be removably coupled and a sleeve with which the spindle is non-rotatably associated but is slidable axially thereon. The spindle carries a grooved hub and a latch mounted in the housing is arranged for engagement therewith to prevent axial movement of the spindle and hence to hold the cone within the housing. The latch may be withdrawn from engagement with the groove to release the spindle and hence permit the core to be removed by sliding the spindle out of the sleeve. The sleeve also has a groove in it and a shift lever is arranged to engage the groove in the sleeve and is normally yieldably held in a position to extend the sleeve in a direction to engage its outer end with the driven shaft of a power unit with which the shredder is associated. By displacement of the lever in the opposite direction the sleeve may be disengaged from the driven shaft. The lever and sleeve constitute a clutch operable to start and stop rotation of the cone. A cover is pivotally mounted near the mouth of the housing for pivotal movement from an open position tilted upwardly from the mouth to permit material to be introduced thereto, to a depressed position close to the cutter cone for the purpose of pressing the material to be shredded into closed contact with the surface of the cone. Tilting movement of the cover is made use of to shift the clutch, that is, the lever controlling the position of the sleeve to hold it disengaged when the cover is opened and to reengage it when the cover is closed. This is effected by a cam fast to a shaft on which the cover is pivoted and which is rotatable therewith. The cam in turn is designed to displace the lever during rotation. The latch and shifting lever are housed within a receptacle surmounting in part the housing and in part the bearing, the latter being provided with a cover plate for concealing the levers and affording access thereto when necessary. The cone itself is detachably connected to the spindle so that it may be removed therefrom to permit cleaning the two independently.

The invention will now be described in greater detail with reference to the accompanying drawings wherein:

Fig. 1 is an elevation of the shredder mounted on a power unit with which it is to be used;

Fig. 2 is a longitudinal vertical section drawn to larger scale taken substantially diametrically through the cutter cone as indicated by the line 2—2 of Fig. 3;

Fig. 3 is a transverse vertical section drawn to larger scale through the shredder taken on the line 3—3 of Fig. 1;

Fig. 4 is an elevation of the shredder drawn to larger scale as seen from the right-hand end of Fig. 1;

Fig. 5 is an elevation of a fragmentary portion of the shredder drawn to larger scale from the right side showing the box containing the latch plate and shift lever with the cover omitted;

Fig. 6 is a fragmentary section to larger scale through the cone shaft showing the shift lever positioned to retract the driving sleeve;

Fig. 7 is an elevation of the driving sleeve drawn to larger scale;

Fig. 8 is an end view of the driving sleeve shown in Fig. 7;

Fig. 9 is a plan view of the latch plate shown in Fig. 5;

Fig. 10 is a plan view of the shifting lever shown in Fig. 5;

Fig. 11 is a fragmentary section through the cone shaft showing the rear end of the cone modified to retard entrance of the shredded material between it and the housing;

Fig. 12 is a front view of the cone drawn to larger scale showing the mouth of the cone with a modified rim to facilitate grasping it; and Fig. 13 is a side view of the mouth of the cone shown in Fig. 12.

Referring to the drawings the shredder 10 has a housing 12 which has an upwardly, open mouth 14 in the form of a hopper (Figs. 2 and 3), defined by spaced parallel walls 16 and 18 (Fig. 2) and connecting walls 20 and 22 (Fig. 3) which extend downwardly to form at the lower part of the housing a generally frusto-conical bottom. The wall 16 has in it an opening 24 (Fig. 2) concentric with the axis of the frusto-conical curved lower part of the housing which forms a discharge opening. The other wall 18 is partially closed as at 26 (Fig. 2) thereby forming the smaller end of the frusto-conical lower part of the housing and has projecting rearwardly from it a bearing boss 28. Surmounting in part the wall 18 and in part the bearing boss 28 is a substantially rectangular box-like receptacle 30 (Fig. 4) which is provided with a cover 32 fastened thereto by suitable screws.

A frusto-conical shredder cone 34 (Fig. 2) is mounted within the frusto-conical lower part of the housing which has an open mouth or rim 36 and a nearly closed smaller end 38. The conical wall of the cone is provided with a plurality of regularly spaced cutting blades or edges 40 which project upwardly from its surface and beneath which are open elongate slots 42 through which material shredded by contact with the blades may pass to enter the inside of the cone and thus be discharged through the mouth thereof.

The cone itself is supported for rotation concentrically with the frusto-conical part of the housing on a shaft and so that it may easily be removed for cleaning is detachably connected thereto. To this end the smaller or closed end 38 of the cone has distributed concentric with its axis of rotation a plurality of regularly spaced openings 44 (Fig. 3) which are adapted to receive a corresponding number of axially offset tongues 46 rigidly carried by the drive shaft. The tongues 46 are carried by a hub 48 (Fig. 2) which in turn is integral with a spindle 50 which forms one element of the drive shaft, the other element of which is a sleeve 52 (Figs. 7 and 8) on the spindle which is journaled in a bearing sleeve 54 projecting rearwardly from the bearing boss 28. The spindle 50 and sleeve 52 are interconnected for concomitant rotation about their longitudinal axes by a pin 56 fixed diametrically in the walls of the sleeve and engaged within a diametrical slot 58 in the spindle. As thus interconnected, rotation of the sleeve imparts rotation to the spindle and at the same time relative axial movement of the spindle and sleeve with respect to each other is permitted without loss of the driving torque between the two. The outer end of the sleeve has coupling prongs 60 (Figs. 7 and 8) which are adapted to be engaged with complementary prongs or grooves 63 at the end of a driving shaft 62 (Fig. 1), such as shown in the kitchen power unit, a portion of which is shown herein at 64 in dot and dash lines and which has in it an open socket 66 adapted snugly to receive the bearing sleeve 54 and to support the shredder in a substantially horizontal position. A spring pressed pin mounted so as to project through the wall of the socket 66 into a depression 53 in the sleeve 54 provides for releasably retaining it in place.

The hub 48 on the spindle 50 has a groove 68 therein with which is engaged a latch bar 70 (Fig. 9) having at its lower end a semicircular recess 72 flanked by forwardly projecting fingers 74 adapted to embrace the spindle within the groove. The latch bar is fastened to the bottom of the box-like receptacle 30 by a screw 76 (Fig. 2) which passes through a slot 78 in the latch bar thereby permitting movement of the latch bar to and from the axis of the spindle 50. The upper end of the latch bar extends through a slot 80 (Fig. 2) at the top of the box and has a finger hold 82 by which it may be grasped and elevated or depressed. By elevating the latch bar the lower end may be disengaged from the groove 68 thereby to release the spindle 50 and hence permit the cone to be drawn from the housing through the opening 24 in the wall 16 together with the spindle so that the cone and spindle may be washed. After removal the parts may be further dismantled by rotating the cone in a counterclockwise direction with respect to the spindle so as to disengage the tongues 46 from the openings 44, thus permitting the cone and shaft to be washed thoroughly independently of each other.

A shift lever 84 (Figs. 5, 6 and 10) is also mounted within the box-like housing and has at its lower end a semicircular recess 86 flanked by a pair of forwardly projecting fingers 88 which are adapted to engage a groove 90 formed in the rear end of the sleeve 52. Intermediate the ends of the shift lever are a pair of trunnion fingers 92 which are seated in notched blocks 93 (Fig. 5) within the box thereby providing a fulcrum on which the shift lever may be tilted. By tilting the shifting lever in a counterclockwise direction (Fig. 2) with respect to its fulcrum, the sleeve 52 is thrust axially outward of the bearing sleeve 54 and may thereby be engaged with the driven shaft 62. The shifting lever and sleeve thus constitute a clutch. By tilting the shift lever in a clockwise direction (Fig. 6) with respect to its fulcrum point the lower end thereof may be caused to shift the sleeve axially toward the left thereby to disengage the prongs 60 from the driving shaft 62. A cam 94 (Figs. 5 and 6) is located within the box 30 fast to the end of a shaft 96 (Fig. 2) journaled near its ends in the walls 16 and 18 above the cone. The cam 94 has flat and raised surfaces 98 and 100 located directly behind the upper end of the shift lever 84 (Fig. 6) so that a portion 102 thereof bears against the cam. A spring 104 compressed between the portion 102 of the lever and the cover plate 32 normally operates yieldably to hold the upper end of the lever pressed against the cam and when the flat portion of the cam is engaged thereby the lower end of the shift lever occupies the position shown in Fig. 2, holding the sleeve thrust axially forward for engagement with the driving shaft 62. By rotating the cam to bring the raised portion 100 behind the lever (Fig. 6) it may be tilted to cause the lower end to withdraw the sleeve axially from engagement with the driving shaft 62.

Engagement and disengagement of the sleeve with the driven shaft is preferably accomplished automatically in a fashion to make the apparatus safe for use, that is to prevent any possibility or likelihood of persons using the apparatus from accidentally thrusting their fingers into engagement with the rotating cone. To this end a cover 106 (Fig. 3) is mounted on the shaft 96 and fastened thereto by pins 108. A handle 110 fast to the cover and provided with a knob 112 for tilting the cover upwardly and backwardly permits access to the open mouth of the housing for the purpose of introducing material to be shredded into the mouth for contact with the cone. After the mouth is filled with material to be shredded the cover is swung downwardly and by pushing downwardly thereon the material may be forced into contact with the cutter cone. While the cover is in its down position, of course, it is impossible for the operator accidentally to thrust his fingers into engagement with the rotating cone. However, when the cover is up, unless the cone is stopped it is possible to thrust one's fingers into the sphere of operation of the cone. Accordingly, the cam is fixed to the shaft 96 in such fashion that when the cover is elevated the high part of the cam is moved behind the shift lever 84 and thus positively draws the sleeve 52 out of driving relation with the driving shaft 62 so that the cone is not rotating and cannot be rotated as long as the cover is in an upwardly and backwardly tilted position. When the cover is swung downwardly to press the material into engagement with the cone the drive is automatically restored.

As heretofore pointed out it is easy to remove the cone and spindle to permit cleaning of these and the housing and the separation of the cone from its hub further facilitates cleaning since it provides access between the end of the cone and the hub which, if impossible to dismantle, might trap oils, moisture and the like which would become rancid. The shredder may further be dismantled to thoroughly clean the bearings and sleeve by removing the cover 32 whereupon the latch plate and shifting lever may readily be taken out thus releasing the sleeve 52 so that it may be removed from the bearing sleeve and cleaned.

A modified cone 114 is shown in Figs. 11 to 13 inclusive. This cone is similar to the cone 34 shown in Fig. 2 in its operation and attachment to the drive shaft 50, with the exception that its mouth and rear end have both been redesigned to facilitate removing the cone for cleaning and to retard the entrance of the material to be shredded behind the cone into the bearings. To facilitate removing the cone the lip 116 is bent rearwardly at a somewhat sharper angle than that shown in Fig. 2 and scalloped or corrugated so as to provide a series of depressions 118 easy to grasp and which affords purchase for the fingers. To retard entrance of the material to be shredded into the space behind the cone and hence into the bearing the rear end of the cone, as shown in Fig. 11, is provided with a series of rearwardly stepped shoulders 120 and the housing is likewise provided with a corresponding series of recesses forming shoulders 130 which interfit with the shoulders at the rear end of the cone and thereby form an axially narrow devious passage extending radially inward from the wall of the cone to the spindle shaft 50, through which it is difficult for material to work its way to the bearing.

In certain other very minor aspects the structure shown in Fig. 11 varies from that shown in Fig. 6, to wit, in that the cover 32 is provided with inwardly extending dimples 132 adapted to bear against the pivot fingers 92 to improve the fulcrum action for the shift lever 84 and an outwardly pressed cup 134 for receiving and stabilizing the outer end of the spring 104.

The shredder as thus described provides a very simple, compact and efficiently operating auxiliary appliance for use with our kitchen power unit which is safe to use, which may be kept in a sanitary condition, and which has an attractive appearance.

It should be understood that the present disclosure is for the purpose of illustration only and that this invention includes all modifications and equivalents which fall within the scope of the appended claims.

We claim:

1. In a shredder assembly a shredder cone, a housing having a lower part surrounding the cone and an upper part in the form of an upwardly extending open mouth hopper subtending a portion of the cone for receiving and funneling material to the surface of the cone, a cover hinged to the hopper, said cover being movable from an elevated position permitting access to the hopper to a depressed position within the hopper close to the cone for pressing material placed in the hopper against the cone, a clutch including fixed and movable parts on the cone and housing respectively, operable to couple the cone to a source of power for effecting rotation of the cone, and an interlock mounted on the housing interconnecting the cover and clutch and operable to establish a driving connection from the cone to the source of power solely when the cover is depressed and to disestablish the drive when the cover is elevated.

2. In a shredder assembly a shredder cone, a housing having a lower part surrounding the cone and an upper part in the form of an upwardly extending open mouth hopper subtending a portion of the cone for receiving and funneling material to the surface of the cone, a cover hinged to the hopper for movement from a position within the hopper adjacent to and covering that portion of the cone subtended by the hopper to a position tilted upwardly and backwardly therefrom to permit access to the hopper, a shaft to which the cone is fast, said shaft being journaled on the housing and having at one end a coupling element adapted to be thrust into driving engagement with a driven shaft by axial sliding movement of the shaft, a lever operable to effect sliding movement of the shaft to disengage the shaft, yieldable means normally operating on the lever to hold the shaft coupled to the source of power and means carried by the cover operable by swinging it to an open position to actuate the lever to disengage the shafts and by swinging into covering position to engage the shafts.

3. In a shredder assembly a shredder cone, means journaled in the housing which supports the cone for rotation therein and is operable to connect the cone to a source of power for driving the cone, and a cover mounted on the hopper and movable from an upwardly standing open position at the mouth of the hopper into the hopper toward the surface of the cone to press the material in the hopper forcibly against the surface of the cone, said cover when elevated to its uppermost open position to permit access to the hopper rendering said first-named means inoperative.

4. A shredder assembly for use with a power unit including a power take-off socket within which is a coupling element, to which the assembly may be coupled, comprising a shredder cone, a shaft to which the cone is fastened for rotation about a horizontal axis, a bearing for the shaft, said bearing constituting a nipple for interengagement with the power socket, said shaft being axially movable in the bearing and having at its end means for drivably engaging the coupling element within the socket, a shifter operable to move the shaft axially to engage it with or disengage it from the coupling element, a hopper for receiving and funneling material to be shredded to the cone, a cover hinged to the hopper and an interlock between the cover and the shifter operable to shift the shaft in a direction to disengage the shaft from the coupling element when the cover is opened and to shift it in a direction to re-engage the shaft with the coupling element when the cover is closed.

5. A shredder assembly comprising a housing having a generally cone-shaped chamber partially closed at one end and open at the other, a bearing sleeve at the partially closed end of the chamber, a shredder cone having a closed smaller end and an open larger end mounted within the chamber with its open end projecting from the open end of the chamber, a spindle shaft connected to the closed end of the cone and journaled for rotation in said bearing at the closed end of the chamber, a latch mounted on the housing engaged with the spindle shaft, preventing axial movement thereof, a sleeve shaft slidable on the spindle shaft, a pin operably connecting the sleeve shaft to the spindle shaft so that rotation of the sleeve shaft imparts rotation to the spindle shaft, prongs on the sleeve shaft engageable with the driven shaft of a power unit to effect rotation of the sleeve shaft and hence the spindle shaft, and a shifter associated with the sleeve shaft for effecting engagement or disengagement thereof with the driven shaft.

6. A shredder assembly comprising a housing having an upwardly open funnel-shaped mouth and a generally conical-shaped lower wall subjacent the mouth defining a chamber for receiving a cone-shaped cutter, said chamber having a discharge opening at one end and a bearing at the other end, a cutter cone located in the chamber, a shaft journaled in the bearing to which the cutter cone is fastened for rotation, said shaft including an inner spindle and an outer sleeve connected by a diametrically arranged pin operating in a slot in one of the parts to effect concomitant rotation of the shaft and sleeve while permitting relative axial movement thereof, a latch engaged with the spindle and operating to prevent axial movement thereof, a shifter engaged with the sleeve and operable to effect axial movement thereof relative to the spindle and prongs carried by the outer end of the sleeve engageable or disengageable by axial movement of the sleeve to effect a driving connection between the sleeve and a driven element.

7. In a shredder according to claim 6, means connected to the latch for disengaging it from the spindle releasing the cone and spindle from the bearing.

8. A shredder assembly comprising a housing having an upwardly open funnel-shaped mouth, a generally conical lower wall subjacent thereto forming a further conical chamber for receiving a cone-shaped cutter, a discharge opening at one end of the wall, a bearing at the opposite end of the wall and a shallow receptacle at the bearing end of the housing surmounting in part the housing and in part the bearing, a cutter cone having an open end and closed end, said cone being mounted at the bottom of the chamber concentric with the lower wall with its open end projecting through the discharge opening, a shaft mounted in the bearing to which the closed end of the cone is fastened for rotation, said shaft including a spindle carrying a hub secured to the cone and having in it a peripheral groove and a sleeve on the spindle having a peripheral groove near one end and prongs at its opposite end, a pin and slot coupling the spindle and sleeve for concomitant rotation while permitting relative axial movement of the sleeve on the spindle, a latch mounted in the receptacle having a lower part engaged with the groove in the hub of the spindle and an upper part projecting from the top of the receptacle by which it may be elevated to disengage the lower end from the groove or depressed to re-engage it with the groove, a shift lever mounted in the receptacle having a lower part engaged with the groove in the sleeve, an intermediate portion resting against a fulcrum point and a spring engaged with its upper end biasing the shift lever in a direction to hold the sleeve extended from its bearing for engagement of its prongs with a driving element, a cam in the receptacle operable to displace the shift lever against the spring in a direction to retract the sleeve, and a cover mounted on the housing for movement from an open position permitting access to the funnel-shaped mouth to a closed position close to the wall of the cone, said cover being operable by movement from open to closed positions to effect operation of the cam.

9. A shredder assembly comprising a housing having a generally cone-shaped chamber partially closed at one end and open at the other, a bearing sleeve at the partially closed end of the chamber, a spindle shaft mounted in the bearing with an end projecting into the chamber and a shredder cone having closed and open ends mounted within the chamber with its open end projecting from the open end of the chamber and its closed end fastened to the spindle shaft adjacent the closed end of the chamber, said closed end of the chamber having in its wall a plurality of generally circular recesses of different diameter arranged symmetrically with respect to the axis of the spindle shaft and stepped axially with the recess of largest diameter innermost and the closed end of the cone having a series of stepped shoulders, arranged to mate with the stepped shoulders in the end wall of the chamber to provide an axially narrow devious passage extending radially inward from the wall of the cone to the spindle shaft.

10. A shredder assembly comprising a housing having a generally cone-shaped chamber partially closed at one end and open at the other, a bearing sleeve at the partially closed end of the chamber, a driving element releasably mounted in the bearing with one end projecting into the chamber, a shredder cone fastened to the driving element and means for releasing the driving element, said cone having a rim folded rearwardly and corrugated peripherally to afford a series of spaced depressions within which the fingers may be placed for gripping the cone to remove it.

References Cited in the file of this patent
UNITED STATES PATENTS

| | | |
|---|---|---|
| 1,598,999 | Wilson | Sept. 7, 1926 |
| 1,997,413 | Fitzgerald | Apr. 9, 1935 |
| 2,596,604 | Schaeffer | May 13, 1952 |